United States Patent [19]
Johnston, Jr.

[11] Patent Number: 5,544,062
[45] Date of Patent: Aug. 6, 1996

[54] AUTOMATED SYSTEM FOR MANUFACTURING OF CUSTOMIZED MILITARY UNIFORM INSIGNIA BADGES

[76] Inventor: Louie E. Johnston, Jr., 5 Jones Cir., Old Hickory, Tenn. 37138

[21] Appl. No.: 381,207

[22] Filed: Jan. 31, 1995

[51] Int. Cl.⁶ .................................................. G06F 19/00
[52] U.S. Cl. .................. 364/468.24; 364/401 R; 364/403; 364/479.03; 364/188; 364/470.01
[58] Field of Search ............................ 364/468, 470, 364/478, 479, 189, 401–403, 188

[56] References Cited

U.S. PATENT DOCUMENTS

| | | | |
|---|---|---|---|
| 4,873,643 | 10/1989 | Powell et al. | 364/468 |
| 5,136,791 | 8/1992 | Teague | 341/83 |
| 5,197,011 | 3/1993 | Biemans | 364/468 |
| 5,311,438 | 5/1994 | Sellers et al. | 364/468 |
| 5,357,439 | 10/1994 | Matsuzaki et al. | 364/468 |
| 5,379,296 | 1/1995 | Johnson et al. | 370/60 |
| 5,409,742 | 4/1995 | Arfsten et al. | 427/555 |

*Primary Examiner*—Roy N. Envall, Jr.
*Assistant Examiner*—Thomas E. Brown
*Attorney, Agent, or Firm*—Waddey & Patterson; Mark J. Patterson

[57] ABSTRACT

A system for the manufacture of customized military uniform insignia badges begins with electronic entry of order data at the store locations. The order data is batched and electronically communicated to a remote manufacturing location where the order data, including custom text, is used to directly control the badge stamping machines.

14 Claims, 16 Drawing Sheets

| Field | Set To | From Order |
|---|---|---|
| ST_CODE | store code | Y |
| DAY | current day of the month | N |
| MONTH | current month of the year | N |
| BADGE | format of badge | Y |
| PAIRS | number of pairs ordered | Y |
| PLASTIC | plastic option | Y |
| TWO_INS | set if two insignias are specified | Y |
| THR_LIN | set if there is a third line | Y |
| GOLD | gold option | Y |
| FIR_SAR | 1st sergeant option | Y |
| BROWN | brown leather option | Y |
| BR_BLACK | brown on black option | Y |
| INSIG1 | first insignia code | Y |
| INSIG1CENTER | first insignia alignment | Y |
| INSIG2 | second insignia code | Y |
| INSIG2CENTER | second insignia alignment | Y |
| NAME | name on badge | Y |
| LAST | last part of name | Y |
| RANK | person's rank | Y |
| BRANCH | branch of service | Y |
| EXTRA | additional line | Y |
| INVOICE | order number | N |
| TOT_BASE | base price | N |
| TOT_OPTIONS | options price | N |
| BATCH | batch number | N |
| STATUS | order status | N |
| entry_data | current date | N |
| balance | sum of price fields | N |

FIG. 13

| Field | Set To |
|---|---|
| BATCH | batch number if a new batch, otherwise not changed |
| USER | 'SRV' |
| ENTRY_DATE | date new batch created |
| ORDERS | if new batch then set to 0; increment by 1 for each order |
| PAIRS | incremented by number of ordered pairs |
| ENT | 0 |
| PRI | 0 |
| MFR | 0 |
| SHI | 0 |
| SHI_POST | 0 |
| PAY | 0 |
| PAY_POST | 0 |
| HELD | 1 while TELEORD is running; reset to 0 when TELEORD is complete |
| STATUS | 1 when the record is created. 3 when posted. |

FIG. 14

| Field | Set To |
|---|---|
| code | If the store record is new then set to a unique number. Assigned to the order. |
| name | If the store record is new then set to "******New Store Code******" |
| addr1 | If the store record is new then set to "MCSS". |
| addr2 | If the store record is new then set to the EMail address. |
| BASE | If the store record is new then set to the product base price. |
| ID | If the store record is new then set to the EMail address read from the order. |

FIG. 15

| Field | Set To |
|---|---|
| INVOICE | Incremented for each order. Assigned to the INVOICE field of the order record. |
| PLASTIC | Used to sum options price. |
| TWO_INS | Used to sum options price. |
| THR_LIN | Used to sum options price. |
| GOLD | Used to sum options price. |
| FIR_SAR | Used to sum options price. |
| BROWN | Used to sum options price. |
| BR_BLACK | Used to sum options price. |

FIG. 16

| Field | Set To |
|---|---|
| st_code | To identify the store to send the reply to. |
| name | Identifies the person the badge is for. |
| reason | The status of the order. |
| invoice | Set if the order number if the order was entered (no errors). |
| sent | Set to 0. |
| date | Date read from the order form. |
| time | Time read from the order form. |

FIG. 17

| Field | Used To |
|---|---|
| st_code | Identify the store to send the message to. |
| name | Allow the store to identify the person the badge is for. |
| reason | Specify the type of reply: Error, Order Entered, etc.. |
| invoice | Specifies the order number. |
| sent | Determine if the reply is already sent. If 0 then the reply is sent and this is set to 1. |
| date | Provide for the store to determine when the order was originated. |
| time | Same as above. |

FIG. 18

| Field | Set To |
|---|---|
| ID | Specify the EMail address the message is to be sent to. |
| REJECT | If the message is an error message then this incremented by 1. |

FIG. 19

AUTOMATED SYSTEM FOR MANUFACTURING OF CUSTOMIZED MILITARY UNIFORM INSIGNIA BADGES

BACKGROUND OF THE INVENTION

The present invention relates generally to the automated manufacturing of articles which are customized in accordance with customer preferences and more particularly to a system for the manufacturing of uniform insignia badges worn by military personnel where customer preference information received at the time of order entry is used to control the manufacturing process.

Virtually all enlisted and officer grade personnel in the military are required to wear uniforms. Typically, these uniforms will include one or more insignia badges which display the name, rank and job function in the military performed by that person. Often, these insignia badges are required to be used on certain uniforms.

In one embodiment of the insignia badge 5 shown on FIG. 21, a small rectangular piece of black leather 8, typically 2.0"×4.0", is used to display an insignia graphical element 6 and custom text 7 by being sewn on or attached to the uniform of the wearer. In the manufacture of the badge 5, a hot foil stamping machine is used to first imprint on the surface of the leather 8 a graphical element 6 representing the rank and/or military job function of the person, selected from several hundred such insignia which have been established by the military over the years. When an order is received for a badge with that graphical element 6, one or more lines of the customized text 7 (name, rank, and branch information) selected by the wearer is then stamped onto the leather 8 in a pre-defined relationship with respect to the graphical element 6. Accordingly, the Military Clothing Sales Stores (MCSS), of which there are hundreds located at the various military bases and posts throughout the United States and the world, have been patronized by thousands of military personnel to select and order customized insignia badges to be placed on their uniforms.

Because it is inefficient for each MCSS to stock the hundreds of various standard insignia badges and/or to equip themselves with the stamping machines and related hardware necessary to customize the insignia badges with the custom text, the military has in the past contracted with third parties to provide the inventory and customized manufacturing operations. In accordance with the prior art badge manufacturing systems, the various MCSS locations would collect the orders from their base personnel for customized insignia badges and transmit them by mail or other conventional means to a local manufacturing locations. The information associated with these various orders would then be compiled at the various manufacturing locations and physically distributed to various stamping machine operators within the factory for manufacturing of the various insignia badges. The printed order information would then be used by the operators to set-up the badge stamping machines. The operators would manually control at least the Y-axis (line-to-line) position of the custom text stamped on the badges.

The prior art method, involving processing of orders and manufacturing operations in multiple locations, has been awkward and inefficient. For example, many man-hours must be dedicated in the use of this prior art system to the processing of orders, sorting of orders by insignia type and/or MCSS location, distributing the orders to the various machine operator locations around the factory, and providing information to and/or manually controlling the foil stamping machines needed to place the custom text on the insignia badges. This inefficiency has substantially delayed the processing of orders and increased the cost of manufacturing because of the labor burden.

What is needed, then, is a manufacturing system for customized military uniform insignia badges in which orders taken at the various MCSS locations can be efficiently processed and used to directly control the manufacturing operations, minimizing the involvement of human effort in the system. Such a manufacturing system is lacking in the prior art.

SUMMARY OF THE INVENTION

An object of the present invention is to provide a manufacturing system for customized uniform insignia badges which minimizes the involvement of human effort in the manufacturing process.

Another object of the present invention is to provide a system for the manufacturing of customized uniform insignia badges in which order data taken at the order entry stage is used to directly control the machines used in the manufacturing process.

A further object of the present invention is to provide a system for the manufacturing of customized uniform insignia badges which lowers the cost and reduces the turnaround time from the instance of order entry to delivery of the manufactured insignia badges to the store locations.

Yet another object of the invention is to include an automated messaging service in an insignia badge manufacturing system so that order errors and order confirmations can be electronically transmitted from the factory to the ordering locations.

In accordance with these and other objects of the present invention which will be apparent below, a manufacturing system is provided in which a two-way electronic communication link is established between the various military clothing sales stores and a centralized electronic order record facility. A further bi-directional communications link is established between the MCSS central records location and a factory processing center so that order data can be electronically communicated to the processing center.

At the factory processing center, a telephone order subsystem includes a computer which is linked to a stamping sub-system. A stamping control computer receives and processes the order data. The processed order data is used to generate, through interface boards attached to the stamping control computer and one or more stamping machines, stamping machine control signals. The microprocessor controlled hot foil stamping machines then stamp the customized text on the uniform insignia badges which have previously been stamped with the selected insignia graphic element. More specifically, text and Y-axis data is assembled by the stamping control computer from the order data received and such text and Y-axis information is then transmitted by an interface to the hot foil stamping machine which uses such information directly in order to select and position the custom text for stamping on the uniform insignia badge. In a preferred embodiment of the invention, the stamping sub-system is capable of simultaneously controlling up to four hot foil stamping machines.

BRIEF DESCRIPTION OF THE DRAWINGS

FIG. 13 is a table showing the ORDERS database record fields set by the TELEORD.EXE sub-routine of the telephone order sub-system of FIG. 7.

FIG. 14 is a table showing the fields set by the TELEORD.EXE of the BATCH records during execution of the telephone order sub-system of FIG. 7.

FIG. 15 is a table showing the STORE fields used by the TELEORD.EXE sub-routine of the telephone order sub-system of FIG. 7.

FIG. 16 is a table showing the INVOICE record fields used by the TELEORD.EXE sub-routine of the telephone order sub-system of FIG. 7.

FIG. 17 is a table showing the REPLY fields used by the TELEORD.EXE sub-routine of the telephone order sub-system of FIG. 7.

FIG. 18 is a table showing the records of the REPLY database used by the TELE_RPY.EXE sub-routine of the telephone order sub-system of FIG. 7.

FIG. 19 is a table showing the fields of the STORE database used by the TELE_RPY.EXE sub-routine of the telephone order sub-system of FIG. 7.

DESCRIPTION OF THE PREFERRED EMBODIMENT

Figure 1:
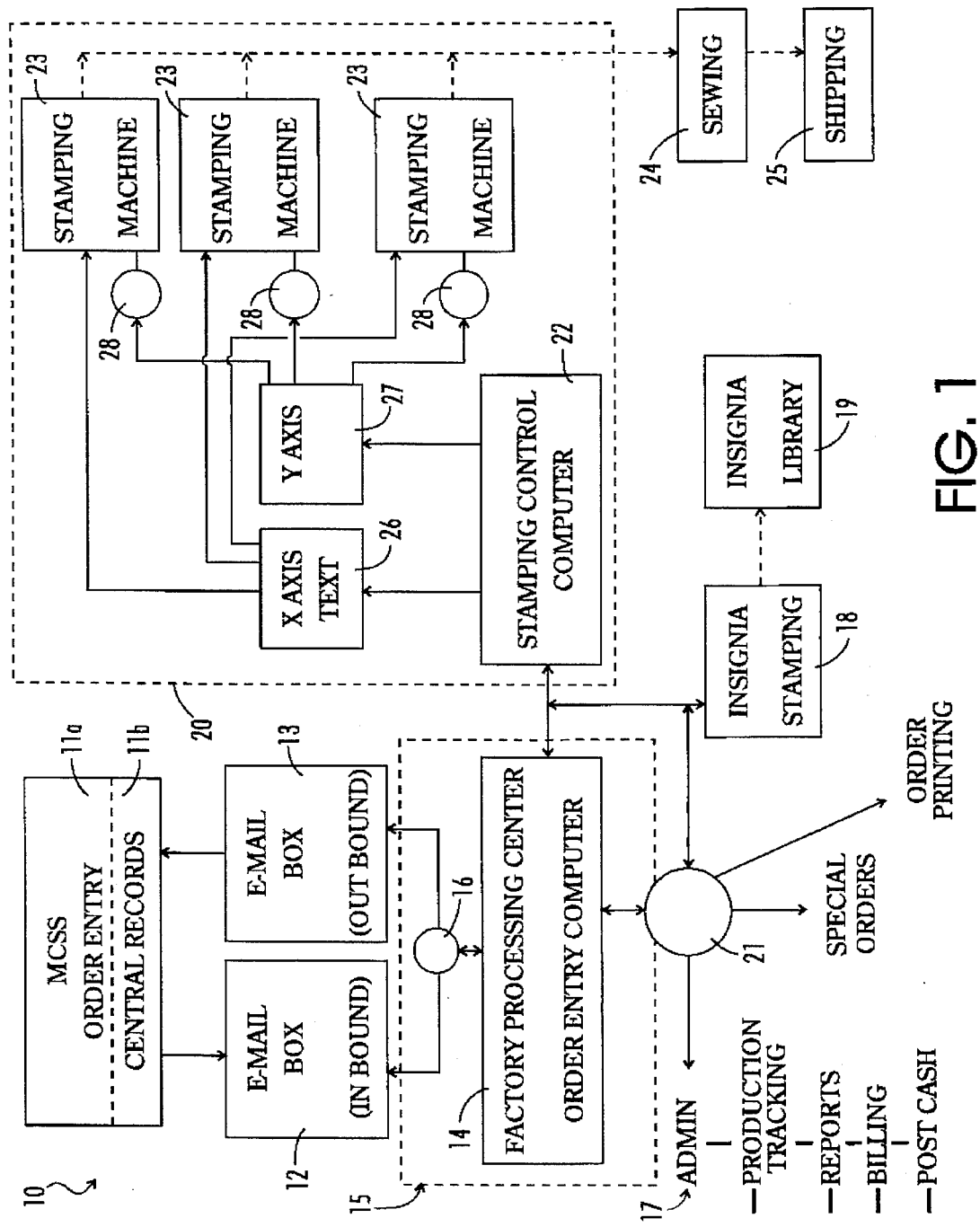
FIG. 1 is a block diagram of system of the present invention.
Figure 7:
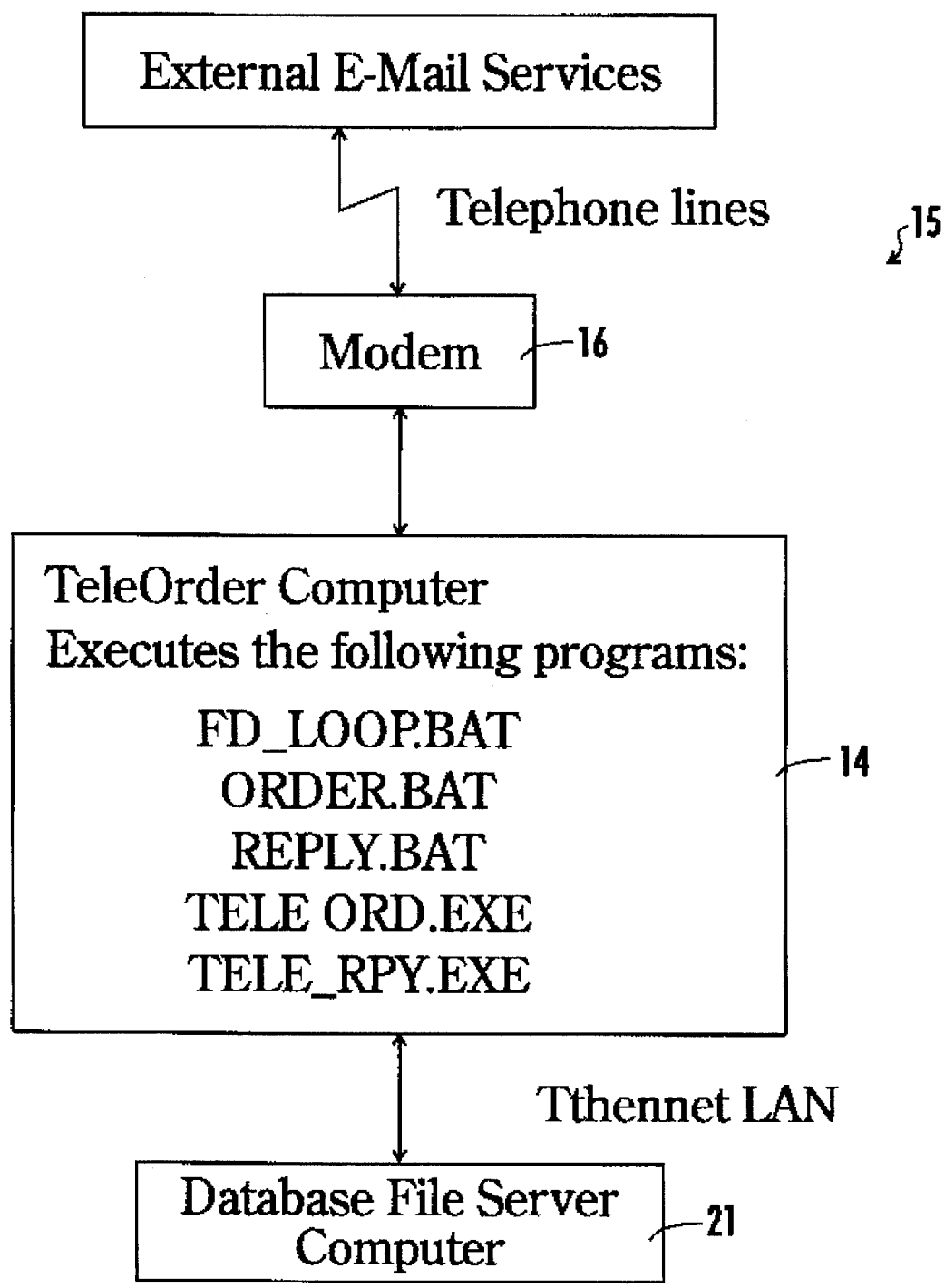
FIG. 7 is a block diagram of the telephone order sub-system shown as part of the system of FIG. 1.

Referring generally to FIGS. 1 and 7, an automated military uniform insignia badge manufacturing system 10 is shown, comprising two primary sub-systems, a telephone order sub-system 15 (FIG. 7) and a stamping sub-system 20. At the starting point of system 10 are the hundreds of Military Clothing Sales Stores (MCSS) 11a which receive orders for customized military uniform insignia badges from various personnel assigned to the base or post on which that MCSS is located.

Figures 20, 21:
FIG. 20 is an illustration of a preferred layout and arrangement of order data fields used to fill out an order by personnel at the military clothing sales store as part of the system of FIG. 1.
FIG. 21 is an illustration of a typical insignia badge which has been stamped with a graphical element and custom text.

Although a variety of formats can be used for taking such orders, FIG. 20 illustrates an order data entry form which can be used in conjunction with the preferred embodiment of system 10. Accordingly, the MCSS sales representative taking the order will enter the store code previously assigned to that MCSS by the factory processing center, along with the name, rank, and service branch of the uniformed personnel placing the order. In addition, the store clerk must enter the badge format (if not the default format), the number of pairs of badges required, and the insignia numbers. The insignia numbers, which are also assigned by the factory processing center, correspond to a particular graphical insignia element associated with the rank, branch, and job function of the person placing the order. Additional spaces are provided for the date of the order and any options preferred by the purchaser for that particular insignia badge.

The order data is manually entered into system 10 at an electronic point of sale (POS) terminal located at the MCSS. Preferably, each MCSS POS terminal is electronically linked to a central MCSS electronic records facility 11b so that as orders are placed at each MCSS, the information about that order is immediately electronically transmitted to a mainframe computer at the central MCSS electronic records facility 11b. However, system 10 can also be configured and programmed so that orders are sent directly to the factory processing center or accumulated at each MCSS location 11a for delayed downloading. Orders accumulated at the central records facility 11b are accessible through inbound E-Mail box 12.

As further seen on FIG. 1, a two-way electronic mail (E-Mail) communications link is established between the central records facility 11a and a telephone order sub-system 15 and order entry computer 14 located at or associated with the factory processing center. A modem 16 which is connected to a standard phone line in a conventional manner provides this link. This allows for batch downloading of insignia badge orders that have been accumulated at the central records facility 11b from in-bound E-Mail box 12 into the factory order entry computer 14. It also allows for electronic communication into outbound E-Mail box 13, from the order entry computer 14, E-Mail messages which report order entry errors and/or confirm the receipt of orders. These can be retrieved by each MCSS 11a as needed.

Preferably, the factory order entry computer 14 will include communications software designed to periodically dial up and log-in to the host computer at the MCSS central electronic records facility and download the accumulated order data from E-Mail box 12. For example, if the order records are kept on an IBM mainframe, IBM EXPEDITE software can be scripted to perform this download unattended at predetermined intervals, such as every thirty minutes.

After a download of a batch of order records, the telephone order entry computer 14 organizes and distributes the order data for use by the stamping sub-system 20 and its associated hardware and software. The order data can also be used by a factory administration sub-system 17 for purposes of tracking production and inventory, generating reports, billing, and posting cash received associated with the processing of the orders.

General Description of the Badge Manufacturing System

The numbers before each paragraph below correspond to the reference numbers in the block diagram of FIG. 1.

11a Military Clothing Sales Stores (MCSS)—Order Entry

Each MCSS 11a is assigned a unique store code by the processing center at the factory. Each MCSS 11a is supplied with an order entry manual which contains traditional military insignia names and insignia number codes identifying each insignia graphical element. The insignia number codes are defined by the factory processing center and stored by the order entry computer 14.

12 Orders From Stores to In-Bound E-Mail Box

Orders are entered by the stores 11a at any time and orders accumulate in the in-bound E-Mail box 12 associated with the MCSS central records facility 11b.

16 Accumulated Orders

The factory processing center, using pre-programmed communications software to control modem 16 and order entry computer 14, periodically retrieves accumulated orders from the in-bound E-Mall box 12. There is no need for synchronized interaction between the stores 11a and the factory.

14 Factory Telephone Order Entry Computer

The factory processing center telephone order entry computer 14 controls the retrieval of accumulated orders from the in-bound E-Mail box 12, assigns a unique identifying number to each order, organizes the orders into batches, and orchestrates the sending of reply and notification messages to the out-bound E-Mail box 13. Replies and notifications consist of order acknowledgments, order entry error notifications, and notifications stating orders have been shipped.

Batches of orders are sorted by store code at the factory. Each order is printed on a 3"×4" card for tracking purposes.

13 Replies and Notifications

E-Mall messages, addressed to various MCSS locations, are sent by the factory processing center order computer 14 at various times to outbound E-Mall box 13. A communications software package, such as ZEUS ASYNCH, can be used to deliver the reply messages to the MCSS central records facility 11b, from where they can be accessed by the proper MCSS 11a.

9 Insignia Stamping

To expedite the overall manufacturing operation, hot foil stamping of the insignia graphical elements 6 onto the leather 8 is performed by one or more graphic stamping machines 18 independently of orders received.

10 Insignia Library

The insignia stamped leather badges (excluding custom text) are stored in an insignia library 19 until needed. The inventory of the various insignia types is tracked by a factory processing center computer 21. When the inventory of a particular type falls below a pre-set level, an instruction is sent to graphic stamping machine 18 to manufacture additional badges 5 having the graphical element with low inventory. The insignia stamped leather badges are pulled from the library according to printed orders and physically delivered to the Stamping sub-system 20.

21 Order Batches

Order batch information is sent to the Stamping sub-system 20 through the factory processing center's computer network 21.

20 Stamping Sub-system

The Stamping sub-system 20 hot foil stamps the custom text 7 associated with a particular order and customer (name, rank and branch of service) onto insignia stamped leather badges according to each order. One stamping control computer 22 can simultaneously control one or more stamping machines 23. The computer 22 controls placement of custom text on the badges according to the insignia configuration in various pre-defined formats as listed in the order entry manual and specified on each order.

24 Automatic Sewing

Hook and loop fabric is attached to the back of the leather badges 5 after stamping. Finished insignia badges 5 are packaged in plastic bags.

25 Shipping

Final shipping packaging is performed according to store code. Invoicing, shipping weight and charges are calculated automatically by computer 21. Orders are posted as being shipped so that the order computer 14 will forward shipping notifications to the stores 11a via outbound E-Mail box 13.

Description of the Telephone Order Sub-system

The numbers before each paragraph heading below correspond to the reference numbers in the block diagrams of FIGS. 1 and 7.

16 Modem

E-Mail is received/sent to/from the MCSS central records facility 11b computer and to/from the factory processing center via modem 16, at 9600 baud, over standard voice telephone lines.

2 Telephone Order Computer

The telephone order computer 14 is an IBM PC compatible. The programs it executes and overall sub-routine calling order are shown below. Source code listings are not provided because the techniques for coding the defined functions and routines are well known to those skilled in the art.

FD_LOOP.BAT calls ORDERS.BAT and REPLY.BAT

ORDERS.BAT calls TELEORD.EXE and REPLY.BAT

REPLY.BAT calls TELE_RPY.EXE

The Telephone Order sub-system 15 retrieves in-bound E-Mail messages (orders), and scans the orders to pick out order specifications. If there is an error in the order text, an error reply message is created and later sent back to the MCSS 11a via outbound E-Mall box 13. Otherwise, an ORDER database record is created and an order entry acknowledgment message is created and sent back to the customer, also via outbound E-Mail box 13. The Telephone order sub-system 15 also sends notification messages to customers when orders are shipped.

Details of each program executed by the telephone order computer 14 are described below.

21 Database File Server Computer

The factory processing center's computer 21 and sub-system hardware are interconnected with an Ethernet Local Area Network (LAN), and share files located on the database file server computer 21.

Telephone Order Sub-system Software Description

FD_LOOP.BAT

FD_LOOP.BAT (FD_LOOP) is the name of the main Telephone order program. FD_LOOP is a batch program that periodically calls other programs to do various tasks.

Figure 8:
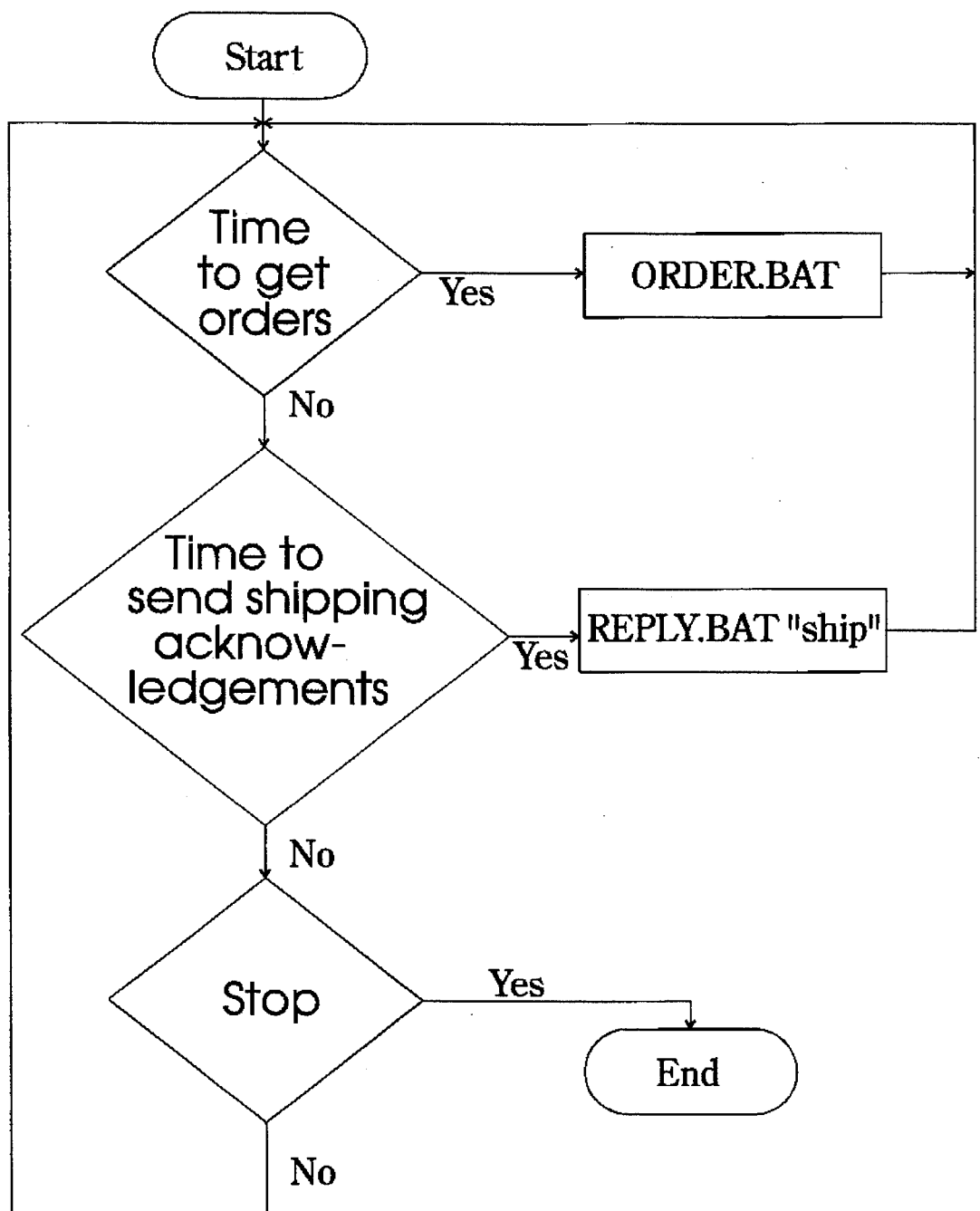
FIG. 8 is a flow chart showing the sequence of operations executed by the FDLOOP.BAT program which is executed by the telephone order sub-system of FIG. 7.

FIG. 8 shows the sequence of operations controlled by the FD_LOOP program, including the ORDERS.BAT and REPLY.BAT sub-routines. FD_LOOP itself does not perform any significant data manipulations. However, some of the sub-routines that FD_LOOP calls do.

ORDERS.BAT

Figure 9:
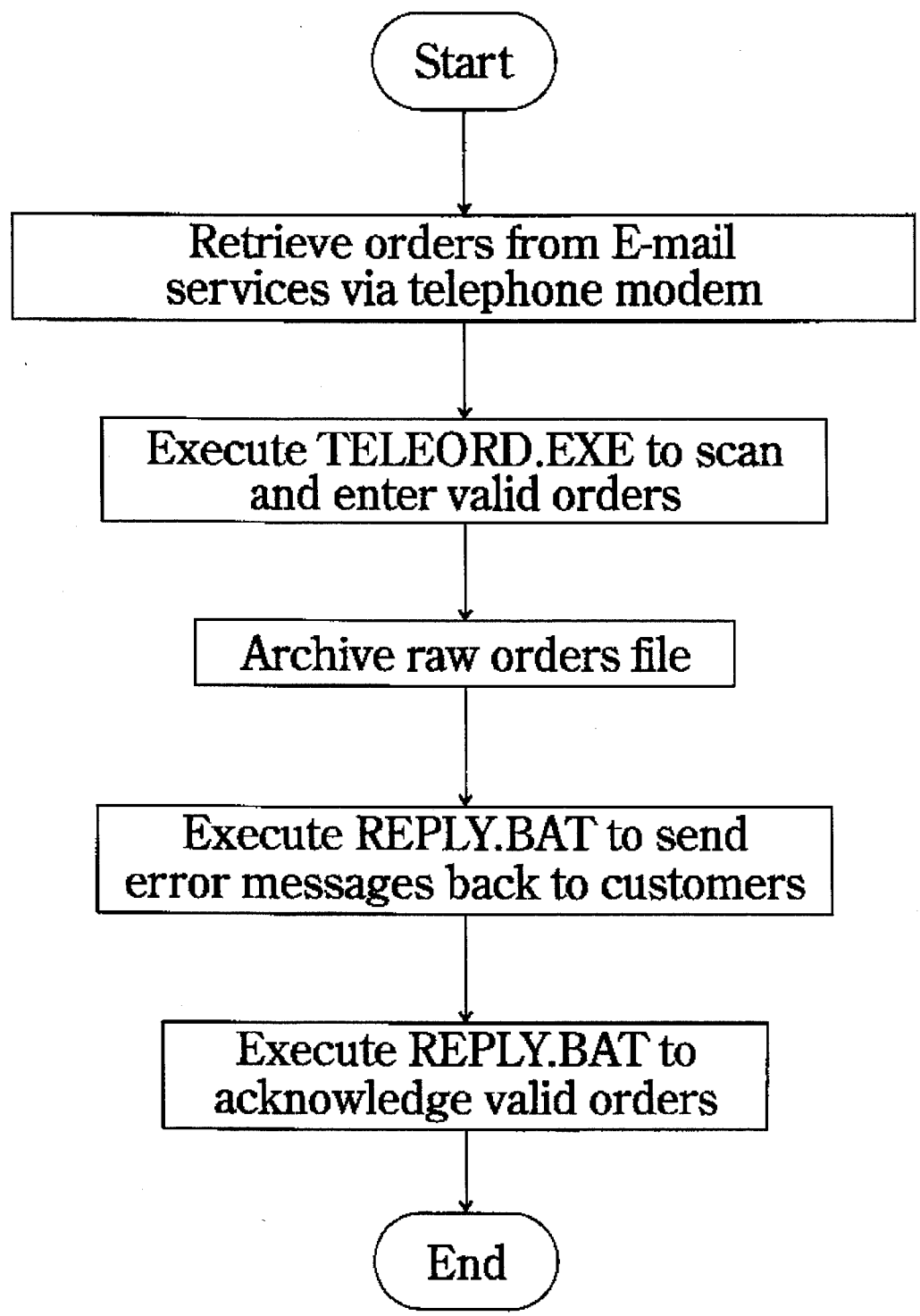
FIG. 9 is a flow chart showing the sequence of operations of the ORDERS.BAT sub-routine executed by the telephone order sub-system of FIG. 7.

ORDERS.BAT (ORDERS) is called by FD_LOOP to retrieve orders from the inbound E-Mail box 12. The ORDERS.BAT flow chart in FIG. 9 illustrates the sequence of operations and sub-routine calls made by the ORDERS program. Orders are retrieved and placed in a raw orders file (ROF). The ROF is a standard text file. Other than being created when the orders are retrieved, the ROF is not modified in any way. The TELEORD.EXE (TELEORD) program (FIG. 11) reads the ROF and creates records in the various database file formats described below. REPLY.BAT (REPLY) (FIG. 10) reads database files and creates standard text files as described below.

TELEORD.EXE

TELEORD.EXE (TELEORD) is called by ORDERS.BAT to scan the ROF and create database records describing each order. TELEORD also creates reply records which are used later by TELE_RPY.EXE. The TELEORD.EXE flow chart (FIG. 11) summarizes the logical decisions and operational sequence of the TELEORD subroutine.

The significant input/output data elements associated with the Telephone Order sub-system 15 are illustrated in FIG.'s 13 through 19 and described below.

The primary data input to the Telephone order sub-system 15 is the ROF, which is a standard text file. The file is read and parsed one line at a time. It contains E-Mail protocol information and the orders as entered by the various MCSS locations 11a.

A first file output generated by the Telephone Order sub-system 15 is called ORDERS, Which is a database file. The CLARION database program can be used to cream and manipulate the data files used in system 10. TELEORD creates and initializes the records of this file according to, among other things, the fields specified in the order form (FIG. 20). FIG. 13 is a table showing the various fields in each record of the ORDERS file.

A second output file created by the Telephone Order sub-system 15 is called BATCH, which is also a database file. TELEORD creates and initializes records of this file when the number of orders received constitute a "batch". At the same time, the previous BATCH record is posted. If not, then the ORDERS field of the current BATCH record is incremented by 1. FIG. 14 is a table showing the various fields in each record of the BATCH file set by TELEORD.

A third output file created by the Telephone Order sub-system 15 is called STORE, also a database file. The STORE file contains a record for each MCSS 11a that places orders. If a store has never placed an order before (i.e., if the MCSS, identified by its E-Mail address, is not in the STORE database) then TELEORD will create a new record for the store. FIG. 15 is a table showing the various fields in each record of the STORE file.

A fourth output database file generated by the Telephone Order sub-system 15 is called INVOICE. A single record is used to create unique invoice numbers (order identification numbers) and maintain options prices. FIG. 16 is a table showing the various fields in each record of the INVOICE file.

A fifth output database file generated by the Telephone Order sub-system 15 is called REPLY. TELEORD creates a record for each order. The record either indicates a data entry error was found in the order, or that the order was successfully entered into the manufacturing system 10. FIG. 17 is a table showing the various fields set by TELORDE.EXE in each record of the REPLY file.

Another series of output files created by the Telephone Order sub-system 15 are identified as "#####.SND" files. TELEORD creates one of these files for each full batch of orders. The "#####" in the file name are replaced with the batch number and 0-padded on the left. These are standard text files. They are used as input data by the Stamping sub-system 20 described below.

REPLY.BAT

Figure 10:
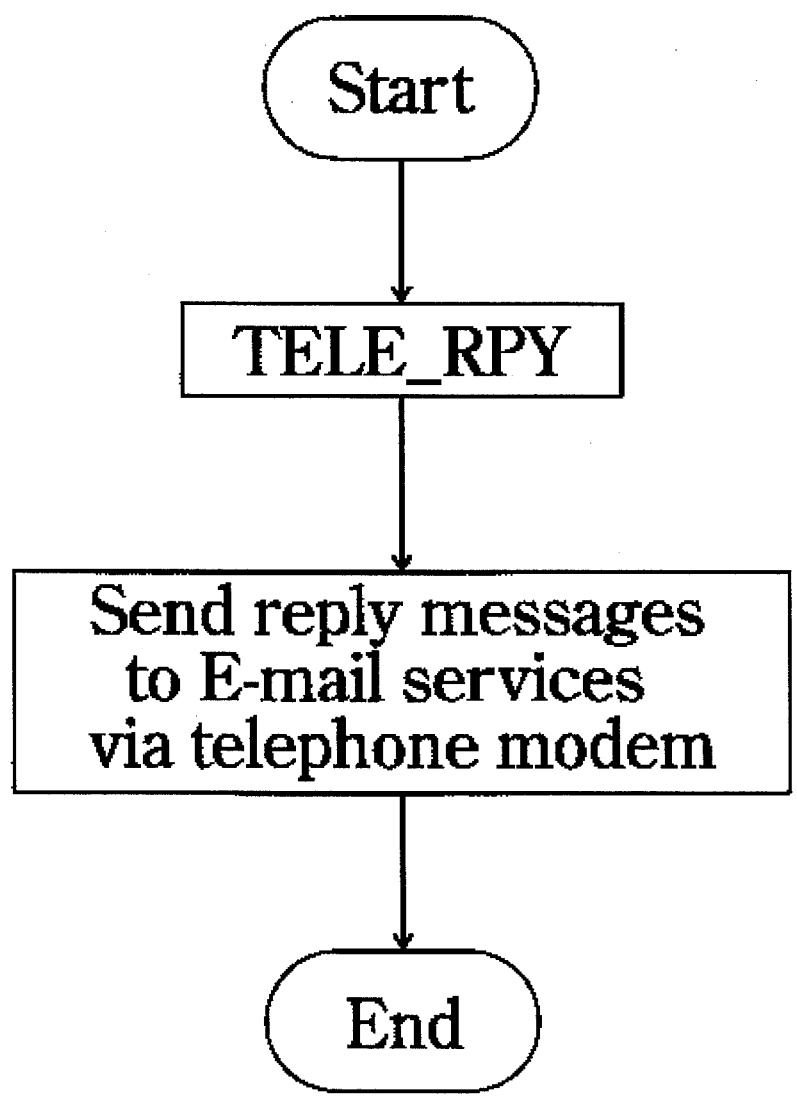
FIG. 10 is a flow chart showing the sequence of operations executed by the REPLY.BAT sub-routine of the telephone order sub-system of FIG. 7.
Figure 11:
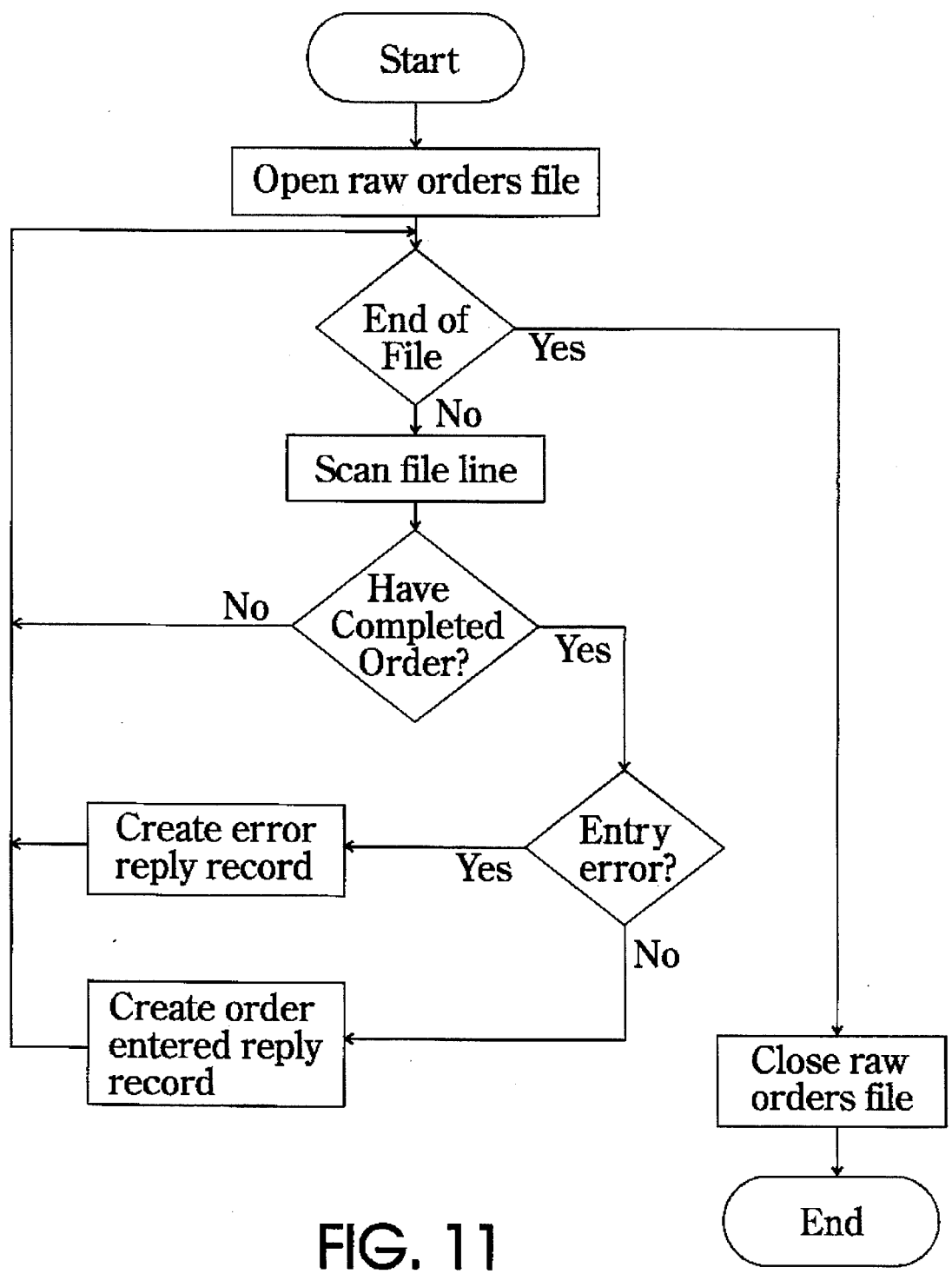
FIG. 11 is a flow chart showing the sequence of operations executed by the TELEORD.EXE sub-routine of the telephone order sub-system of FIG. 7.

REPLY.BAT (REPLY) is called by ORDERS.BAT to send replies back to the MCSS locations 11a after the ROF has been processed. REPLY is used twice for each run of ORDERS.BAT: Once to send messages indicating order entry errors and a second time to send acknowledgments assuring the MCSS that the orders are received and entered. The REPLY.BAT flow chart is shown in FIG. 10.

REPLY executes TELE_RPY.EXE which creates standard text files that contain the messages to be sent. After the messages are sent the files are deleted.

TELE_RPY.EXE

Figure 12:
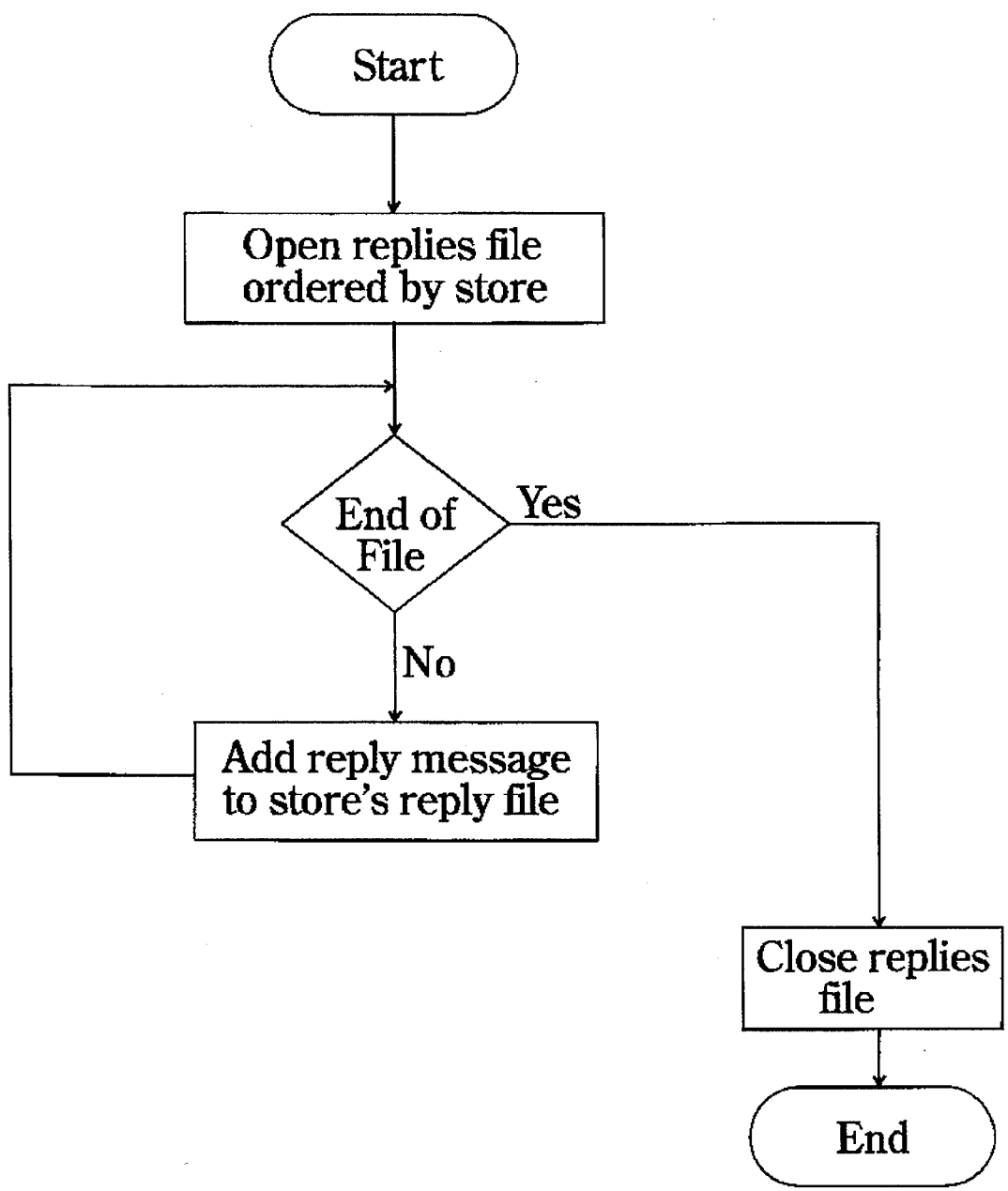
FIG. 12 is a flow chart showing the sequence of operations executed by the TELE_RPY.EXE sub-routine of the telephone order sub-system of FIG. 7.

TELE_RPY.EXE (TELE_RPY) is called by REPLY.BAT to extract reply records from a database file and create standard text files which are suitable for sending as E-Mail. The TELE_RPY.EXE flow chart of FIG. 12 shows the logical sequence of operations performed by the TELE_RPY sub-routine.

A first input file for TELE_RPY is the database file REPLY. The records of this database define the E-Mail messages to be sent to outbound E-Mail box 13. FIG. 18 is a table showing the various fields used by TELE_RPY.EXE from each record of the REPLY file.

A second input file used by TELE_RPY.EXE is the STORE database file. TELE_RPY reads records from this database primarily to retrieve the store's E-Mail address. FIG. 19 is a table showing the various fields used by TELE_RPY.EXE from each record of the STORE file.

Description of the Stamping Sub-system

In order to expedite the processing of orders, and to minimize the labor burden of a manufacturing system used to produce customized badges, a Stamping sub-system 20 is provided in which pertinent order data is electronically communicated from the factory telephone order computer 14 to the Stamping sub-system 20. Looking at FIG. 1, the Stamping sub-system 20 includes a stamping control computer 22 which is electronically linked to single or multiple hot foil stamping machines 23, and to a local area network file server 21 containing the database information necessary for executing the orders received.

In the preferred embodiment of the system 10, the stamping machines 23 are EasyMark hot foil lettering system machines manufactured by Didde Web Press Corporation of Emporia, Kans. These machines are microprocessor controlled, having a turning print wheel similar to an electronic typewriter or daisy wheel computer printer. Each stamping machine has its own IBM compatible keyboard with a forty character, two-line display for editing. It can print at a rate of seventy-five to ninety characters per minute. In addition to keyboard entry of the data to be printed on the badges, machine control signals, including custom text character definitions, character spacing (X-axis) and line position (Y-Axis), can be sent to the stamping machines 23 from an IBM PC compatible computer. The stamping machines 23 have an integrated circuit board with a microprocessor which allows for external control of the location of the letter on the print wheel, proportional spacing, and for the transmission of machine control data from a remote PC (such as the stamping control computer 22) through an RS232 serial port. Up to twelve hundred lines of text data at a time can be downloaded because machine 23 has 24 KB of memory for that purpose. The transfer of data occurs at 2400 baud, with eight data bits, one stop bit, and no parity.

In a preferred embodiment, the serial port of each of three stamping machine 23 is wired to one of three serial ports 26 associated with a single stamping control computer 22. Character data to create the custom text as well as character spacing data (X-axis) is communicated through the serial ports 26 of stamping control computer 22.

In addition, the stamping control computer 22 of the stamping sub-system 20 communicates with a special Y-axis data interface board 27 preferably mounted in an expansion card slot within computer 22. In conjunction with the processor in the stamping control computer 22, the interface board 27 is adapted to interpret order data and produce Y-axis machine control signals. These signals are electrically transmitted to a precision stepper motor 28 mounted in or attached to each stamping machine. The stepper motor 28, which replaces the manual Y-axis control knob supplied with the machine, incrementally adjusts the front-to-back position of the badge being stamped in the stamping machine 23 so that the customized text information is placed at the proper location on the insignia badge. In a preferred embodiment of the system, the stepper motor is a Model PH266-01 manufactured by Oriental Motor Co. The interface board 27 is a Model SC-149 Smart Stepper Motor Controller manufactured by Alpha Products Company of Fairfield, Conn. This interface board has three separate serial ports for sending Y-axis machine control signals to three separate stamping machines 23. Using this technique, each stamping machine 23 can typically manufacture fifty insignia badges per hour.

The numbers before each paragraph heading below correspond to the reference numbers on FIG. 1.

22 Stamping Control Computer

The Stamping Control computer retrieves batch files from the database file server 21. A batch file specifies order data—the insignia graphical element on the leather, and the custom text (persons name, rank and service) to be stamped. The insignia graphical element information is used to calculate placement of text on the badge. Three or more stamping machines 21 are controlled simultaneously.

The Stamping Control computer executes the following programs:
WINSTAMP.EXE calls EXPBATCH.EXE
WINSTAMP.EXE sends messages to YAXIS.EXE
WINSTAMP.EXE and YAXIS.EXE are Microsoft Windows
 applications that run simultaneously.

23 Stamping Machines

Each stamping machine 23 may be loaded with 4 or more pieces of leather at one time. The leather pieces are held in place by vacuum. The leather is moved by the stepper motors to the proper location beneath the print wheel.

21 Database File Server Computer

The factory processing center computer systems are interconnected by an Ethernet Local Area Network (LAN), and share files located on the database file server computer 21. The files used by the Stamping Control computer 22 are located on the file server 21.

Stamping Sub-system Software Description

WINSTAMP.EXE

Figures 5, 6:
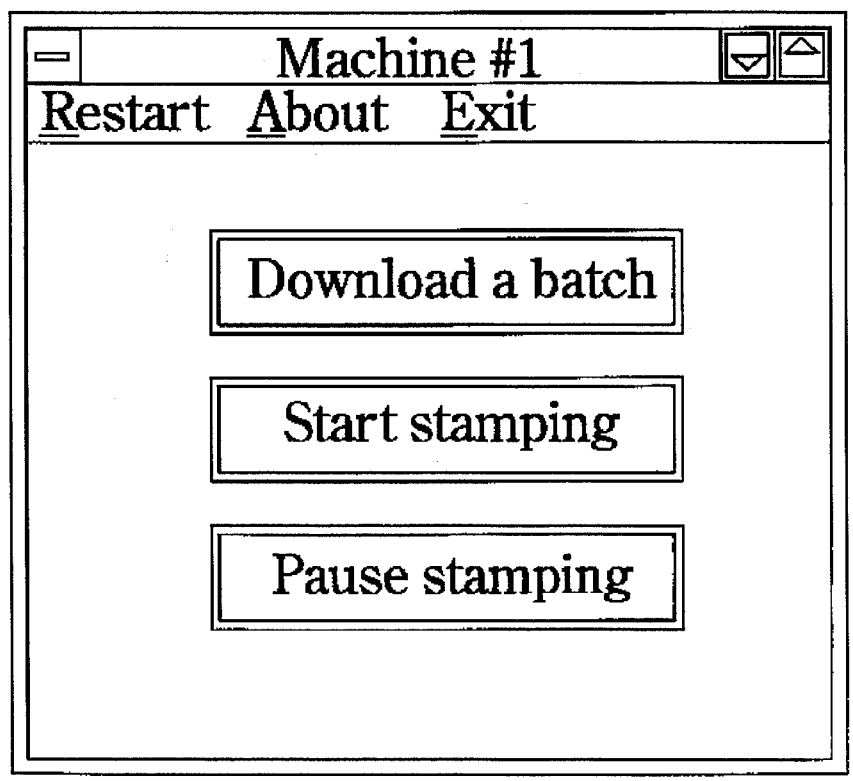
FIG. 5 is an illustration of the appearance of the graphical user interface displayed to the operator of the Stamping sub-system for a single stamping machine when the WINSTAMP.EXE program is ready for execution.
FIG. 6 represents the record fields used by the EXPBATCH.EXE program from the ORDERS database when preparing the order batch for foil stamping.

WINSTAMP.EXE (WINSTAMP) is the name of the primary Stamping sub-system 20 program. In a preferred embodiment of the system 10, the Stamping Control computer 22 executes three instances of this program simultaneously in separate windows, one for each stamping machine 23. The three windows and machines 23 do not interact with each other so that each stamping machine 23 can function independently and work on the same or a different order batch as another machine 23. FIG. 5 shows one WINSTAMP program window as it appears on the monitor attached to stamping control computer 22.

Figure 2:
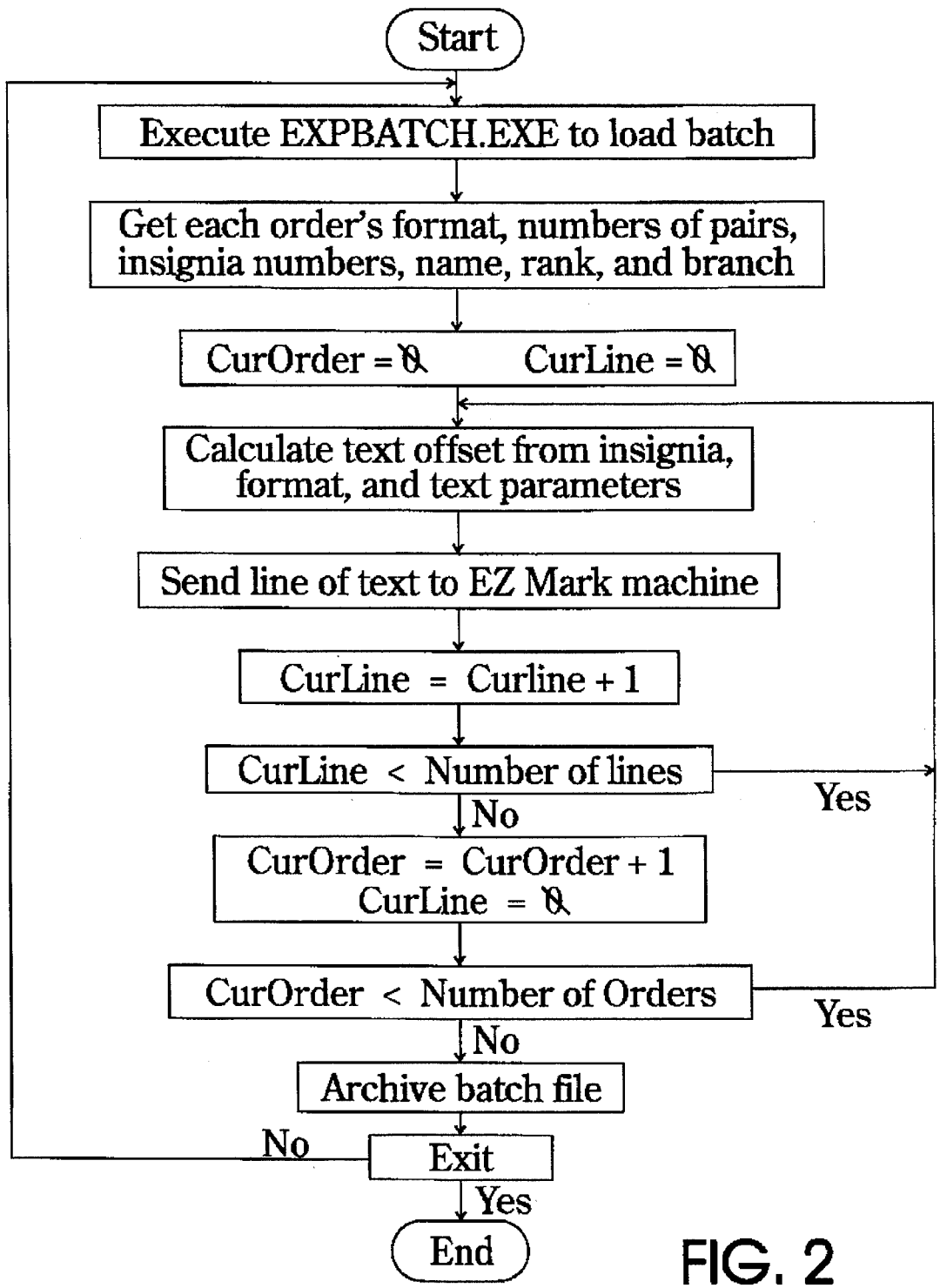
FIG. 2 is a flow chart of the steps executed by the program (WINSTAMP.EXE) which controls the hot foil stamping machines of the system.

The WINSTAMP.EXE flow chart diagram of FIG. 2 describes the sequence of operations and sub-routine calls made by the WINSTAMP program. The description of the YAXIS.EXE program below contains definitions of the windows messages.

The input data file for WINSTAMP is the standard text file BATCH.EXP. This file contains the order number, insignia number, badge format, person's name, rank and branch, and optional extra text. The insignia number and badge format are used to calculate the placement of text stamped on the badge. The name, rank, branch and extra text are what is stamped as custom text.

A first output from WINSTAMP is data to set the Y-axis of the stamping machine 23. Machine control signals are provided to position the badge for each line of text to be stamped.

A second output from WINSTAMP contains the lines of text to be printed. This text information is transmitted through the regular serial communications port 26 connected to the stamping machines 23.

The WINSTAMP programs also send the following messages to the YAXIS program: BWI_YAXIS_COMMAND and BWI_YAXIS_WAIT The WINSTAMP programs also receives from the YAXIS program the BWI_YAXIS_IDLE messages.

EXPBATCH.EXE

Figure 3:
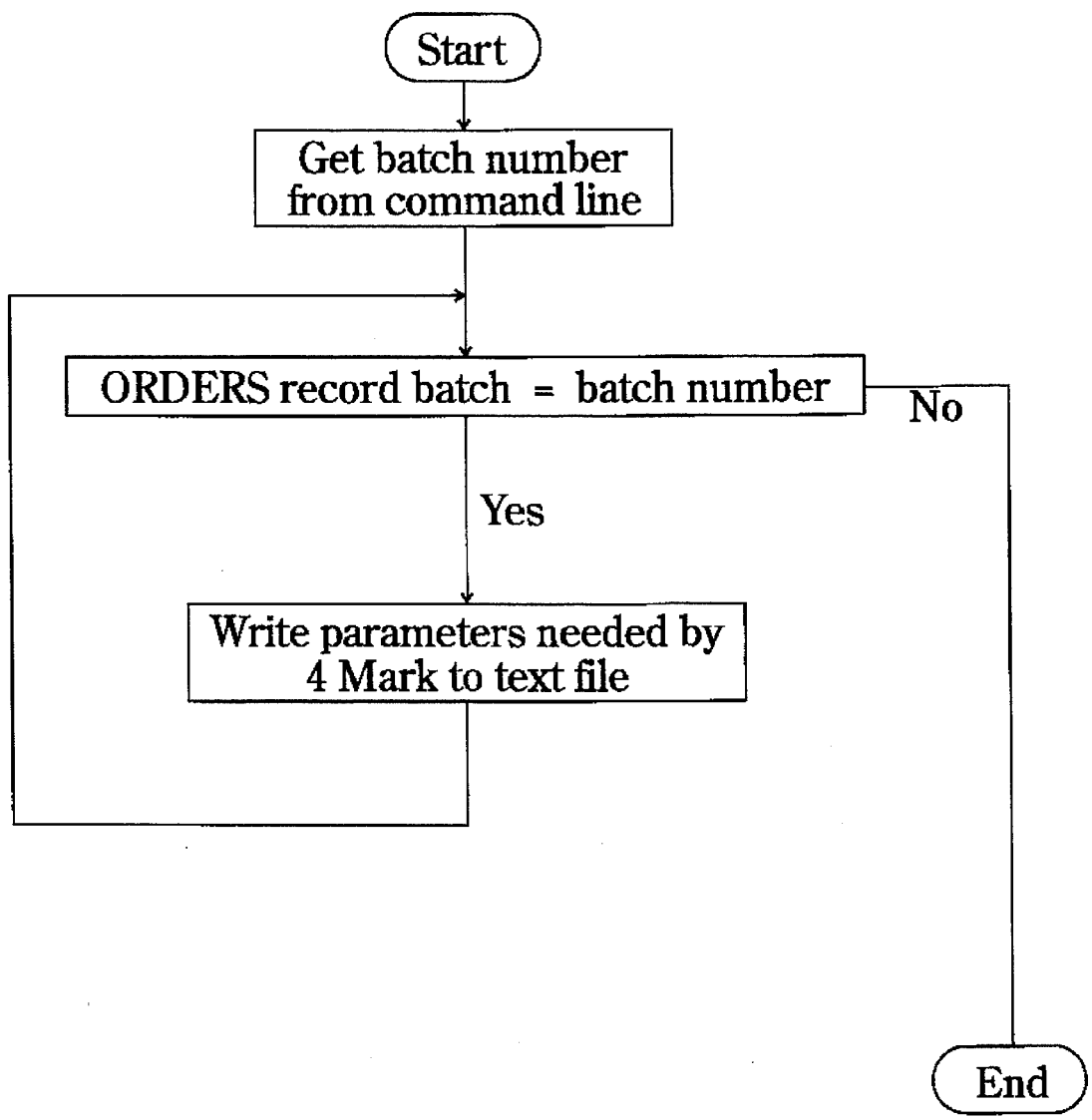
FIG. 3 is a flow chart of the steps of the EXPBATCH.EXE subroutine executed within the WINSTAMP.EXE program, the purpose of which is to retrieve and batch load the orders for badges and to write the text machine control signals to a file for use by the foil stamping machine.

EXPBATCH.EXE (EXPBATCH) is called by WINSTAMP to create the BATCH.EXP file. The EXPBATCH.EXE flow chart, summarizing the operations of EXPBATCH sub-routine is shown on FIG. 3.

EXPBATCH reads those records from the ORDERS database that have a batch number matching the batch that is being prepared for the stamping machines 23. The fields listed in FIG. 6 are written to a standard text file.

BATCH.EXP is a standard text file created by EXPBATCH. This file contains the fields listed in FIG. 6. The values of the fields are printed in the text file in a format that the WINSTAMP.EXE program accepts.

YAXIS.EXE

Figure 4:
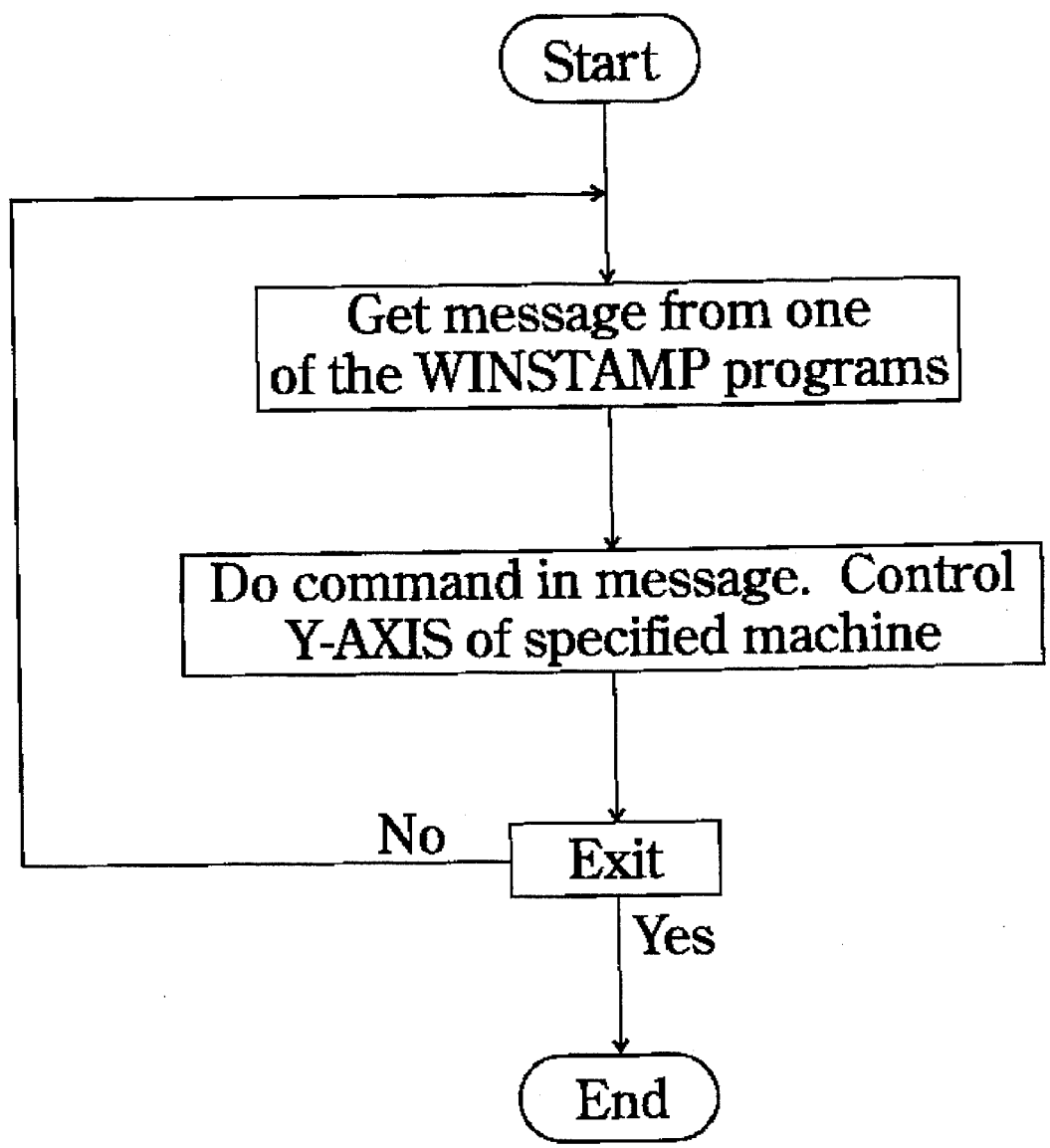
FIG. 4 is a flow chart of the YAXIS.EXE subroutine of the WINSTAMP.EXE program, the purpose of which is to properly position the customized text to be stamped on the badge adjacent the graphic insignia element, by generating Y-axis machine control signals for a specified foil stamping machine in the system.

YAXIS.EXE (YAXIS) is used to interpret the custom text and insignia type data and arbitrate access to the Y-axis controller (stepper motor 28) that drives the Y-axis motors of the three stamping machines 23. One instance of YAXIS runs and the three windows of WINSTAMP communicate with YAXIS using the Microsoft Windows message passing scheme. See the YAXIS.EXE flow chart (FIG. 4) for a summary of the operational sequence of the YAXIS sub-routine.

Each message described below contains data of the following structure:

```
typedef struct YAxisData_struct
{
HWND  MainWindow;       // Main window of the
                        WINSTAMP program.
char * YAxisString;     // Command to the Y axis
                        motor.
} YAXISDATA;
```

Depending on the purpose of the message, the MainWindow and/or YAxisString fields of the message data may not be used.

The YAXIS program inputs the following messages from the WINSTAMP programs: BWI_YAXIS_COMMAND and BWI_YAXIS_WAIT. The YAXIS program sends the following message(s) to the WINSTAMP program: BWI_YAXIS_IDLE Although the system 10 has been described with respect to the stamping of custom text made up of characters describing the name, rank, and branch of the wearer, the system 10 can also be used to create dress uniform service ribbons where the individual service ribbon colors must be worn in a specified sequence. When used in this application, the service ribbon would be the insignia badge, and the custom text would be the arrangement of individual service ribbon colors in response to order data which define the ribbon colors to be used.

Thus, although there have been described particular embodiments of the present invention of a new and useful system for manufacturing of customized military uniform insignia badges, it is not intended that such references be construed as limitations upon the scope of this invention except as set forth in the following claims. Further, although there have been described certain operational parameters used in the preferred embodiment, it is not intended that such parameters be construed as limitations upon the scope of this invention except as set forth in the following claims.

What I claim is:

1. A system for manufacturing of customized military uniform insignia badges, each manufactured insignia badge including a graphical element and customized text selected by a customer at a store, the system comprising:
   a. order entry means for electronically entering order data at an ordering store, the order data including insignia information associated with the graphical insignia element selected by the customer and the customized text associated with the customer, the order data further including information which identifies the customer and the ordering store;
   b. telephone order sub-system means for electronically communicating the order data to an order processing computer, the order processing computer located at a factory processing center remote from the store, the telephone order sub-system means including means to electronically organize and communicate the order data to the order processing computer in batches;
   c. stamping sub-system means for stamping the customized text on the insignia badge, the stamping sub-system located remotely from the store and comprising at least one stamping machine and stamping control computer means for sending machine control signals to the stamping machines, the stamping machines responsive to he machine control signals;
   d. first communications means for electronically communicating the order data from the order processing computer to the stamping sub-system; and
   e. the stamping sub-system further comprising processor and interface means for interpreting and incorporating the order data received from the first communications means into the machine control signals whereby the stamping machines stamp the insignia badge with the customized text.

2. The system of claim 1, the machine control signals including custom text data and Y-axis position data indicative of locations on the insignia badge where the custom text is to be stamped.

3. The system of claim 2, the stamping sub-system comprising at least three stamping machines.

4. The system of claim 3, the telephone order sub-system further comprising message reply means to send error messages and order confirmation messages from the factory processing center to the store.

5. The system of claim 4, further comprising insignia graphic stamping means to stamp the insignia badges with the graphical element selected by the customer prior to stamping the customized text and second communications means to electronically communicate the insignia data to the insignia graphic stamping means.

6. The system of claim 5 wherein said stamping control computer means includes means for simultaneously controlling at least three stamping machines.

7. The system of claim 6 wherein the processor and interface means comprises an X-axis and text serial interface port operatively connected to each stamping machine.

8. The system of claim 7 wherein the processor and interface means further comprises a Y-axis interface means for communicating the Y-axis position indicating data from the stamping control computer to a stepper motor controller, the stepper motor controller operatively connected to the stamping machine.

9. The system of claim 8 further comprising a central electronic records facility electronically linked to a plurality of stores, said electronic records facility including means to store a plurality of order data received from the stores, and the telephone order sub-system electronically linked to the electronic central records facility.

10. A uniform insignia badge manufacturing system electronically linked to a plurality of military clothing stores, the system comprising:
   a. inbound and outbound electronic mail boxes linked to the stores;
   b. stamping means to stamp custom badge text on the badges, the stamping means responsive to digitized badge text signals corresponding to the custom badge text;
   c. means to transfer the digitized badge text signals from the stores to the inbound electronic mailbox;
   d. means to download the digitized custom badge text signals from the inbound electronic mailbox to the stamping means; and
   e. means to upload digitized order status messages from the system to the outbound electronic mailbox.

11. A method of manufacturing a military uniform insignia badge, the badge including a graphical insignia combined with custom text selected by a purchaser at an ordering location, the method comprising the steps of:
   a. electronically transmitting multiple badge orders from multiple ordering locations to a remote manufacturing location, the badge orders including graphical insignia data and the custom text associated with each order, each badge order further including information which identifies the purchaser and the ordering location corresponding to that badge order;
   b. electronically communicating the insignia data and custom text to at least one stamping machine, each stamping machine having a badge printing mechanism responsive to the graphical insignia data and to the custom text to determine placement and content of text to be stamped on the badge; and
   c. printing the custom text on the badges in accordance with the orders, and associating the badges after printing at the remote manufacturing location with the purchaser and ordering location information which has been electronically transmitted to the remote manufacturing location.

12. The method of claim 11 further comprising the step of electronically communicating reply messages from the manufacturing location to the ordering locations, the reply messages including order confirmation messages.

13. A method of manufacturing customized military insignia badges comprising the steps of:

a. accumulating in an electronic central records facility a batch of badge order records, each order record including digitized insignia type data and digitized text data defining custom text to be placed on the badge;

b. electronically delivering the batched order records to a stamping control computer located remotely from the central records facility;

c. converting the digitized insignia type data and digitized text data into machine control signals which correspond to the custom text and custom text position;

d. communicating the machine control signals to at least one stamping machine, the stamping machines responsive to the machine control signals; and e. stamping the badges in the stamping machines with custom text defined and positioned in accordance with the machine control signals.

14. The method of claim 13 wherein the badges are stamped by multiple stamping machines operating independently of each other.

* * * * *